United States Patent Office 3,444,544
Patented May 13, 1969

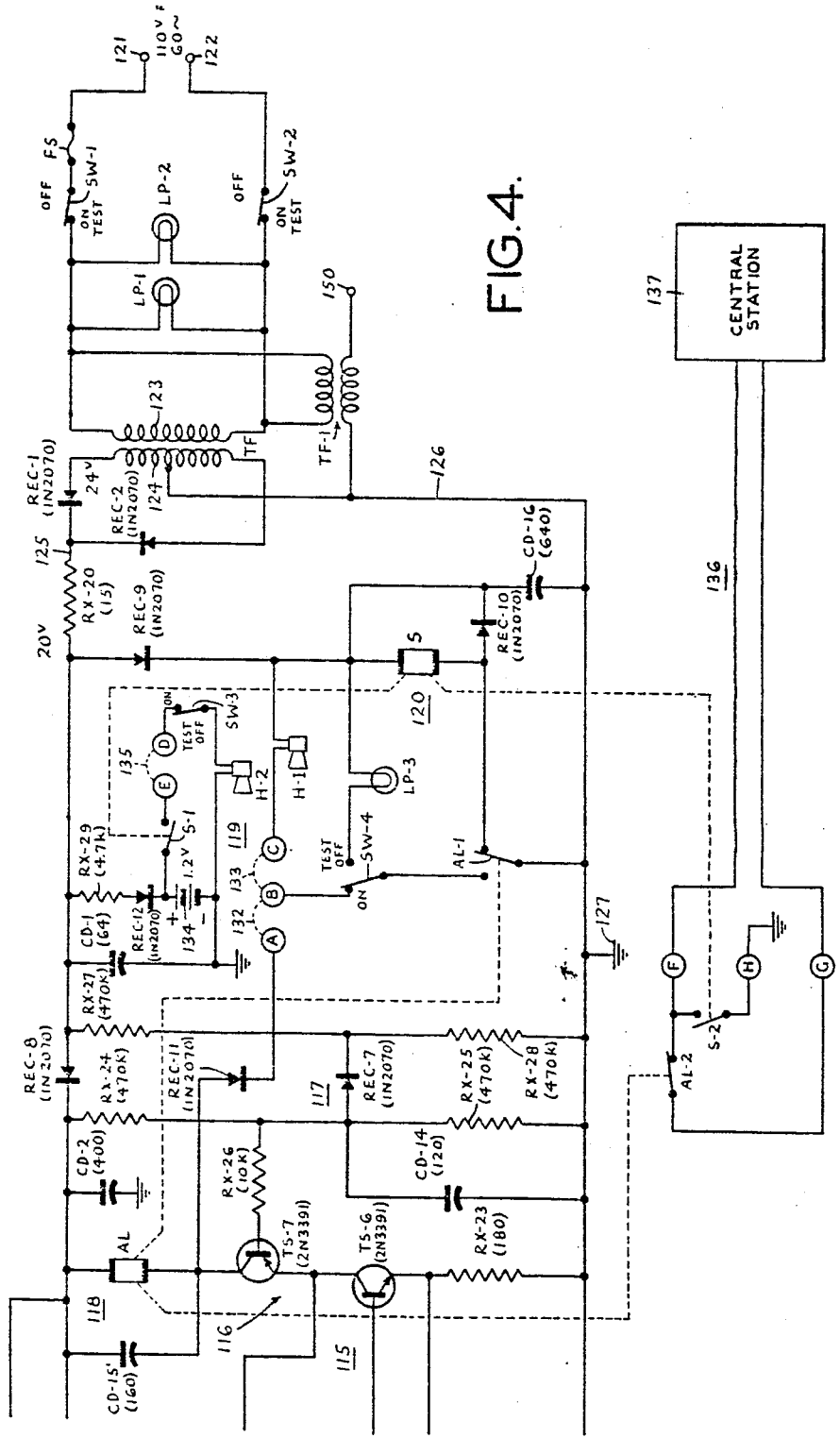

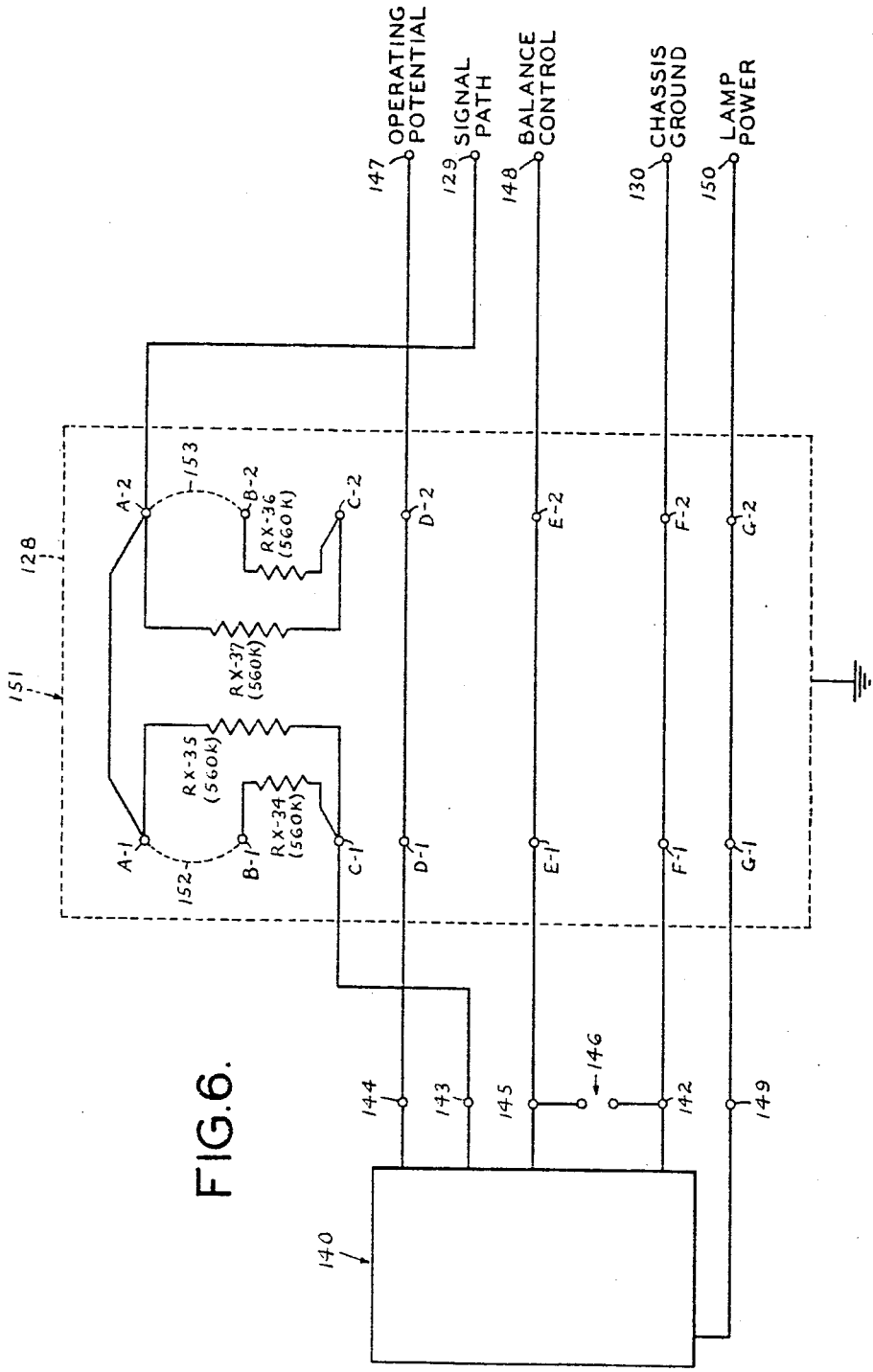

3,444,544
LIGHT MODULATED INTRUSION DETECTION SYSTEM
Howard Pearson, New York, and Willi A. Busch, New Rochelle, N.Y., assignors to American District Telegraph Company, Jersey City, N.J., a corporation of New Jersey
Filed July 19, 1965, Ser. No. 472,779
Int. Cl. G08b *13/18*
U.S. Cl. 340—258                                   12 Claims

ABSTRACT OF THE DISCLOSURE

A method and apparatus for detecting motion. The method involves the steps of filling the space to be protected with illumination having at least a substantial alternating component and separately detecting at a plurality of closely spaced points the illumination reflected from the space and from light reflective objects in the space. A corresponding alternating voltage is produced which has a carrier frequency equal to the frequency of the alternating component. The carrier frequency is amplitude modulated by changes in detected reflected illumination resulting from motion of objects in the space. The alternating voltage is amplified, direct current components are suppressed and then the alternating voltage is demodulated to produce a signal corresponding to the modulation components. Variations in the signal are used to produce an alarm. The apparatus of the invention comprises a source of modulated illumination, and a detector formed by a means to focus the illumination reflected from the space and a plurality of closely spaced photocells disposed along an arc coinciding with the image plane of the focusing means. The photocells are connected in parallel in alternate polarity configuration and an amplifier with negative feedback means is coupled to the photocells to amplify the carrier frequency output and a selected range of modulation components but with attenuation of other components. A demodulator is coupled to the amplifier output to produce a signal proportional to modulation components in the selected range. An alarm means is operated on a selected change in the signal.

The present invention relates to a method and apparatus for detecting motion and more particularly to a method and apparatus for detecting motion within a defined space and based upon optical principles.

Various systems for detecting motion, e.g., as that of an intruder, within a defined space have been known and used for years with generally satisfactory results insofar as the ability to detect motion is concerned. A procedure common to many of these systems has been to flood the space to be protected with energy and to detect the disturbances caused in the energy pattern by the motion of an intruder.

The energy employed for such purposes in the past sometimes has been radio frequency electromagnetic energy and sometimes lower frequency ultrasonic energy. Each form of energy, however, has been found to possess certain disadvantages. An example of a system employing electromagnetic energy in the radio frequency range is described in U.S. Patent No. 2,247,246 to Lindsay et al. Practical experience with systems of this type has shown them to be susceptible to false alarms because the energy cannot readily be confined to an ordinary room. Consequently, unless elaborate and expensive metallic shielding or the equivalent is provided, the energy will escape from the desired space and innocuous activity outside of this space will often result in a spurious alarm. For instance, a truck or automobile passing at some distance from the protected space has often been the cause of false alarm signals.

To overcome the aforementioned difficulty, energy in the ultrasonic range has been utilized and an example of a protection system of this type is described in U.S. Patent No. 2,769,972 to MacDonald. While ultrasonic energy is effectively confined within an ordinary room and is little, if at all, affected by external activity, the energy is airborne (sound being essentialy a pressure effect). As a consequence, air currents within the protected space affect the distribution of sound and, under appropriate conditions, result in spurious alarms. Typical causes of alarm simulating conditions are the functioning of heating and cooling systems which produce convection currents, ringing telephones and other noise producing sources and the wind acting through poorly fitted doors and windows.

The inherent ability of the ultarsonic system to respond to air currents permits its use as a fire detector since the system is capable of detecting the thermal air movements resulting from a heat source. However, the great majority of rooms for which either fire or intruder protection is desired are susceptible to air currents arising from various innocuous sources and the resulting false alarm problem has led to the operation of such systems at sensitivity settings below prudent requirements and to substantial complexities in design in the effort to overcome the unwanted effects of air currents.

It therefore has been a principal object of the present invention to provide a novel method and apparatus for the detection of motion which are not subject to false alarms caused by activity outside the protected space or by the presence of air currents within the protected space.

Another object of the present invention has been the provision of a method and apparatus which will detect the presence of flame and/or smoke within the protected space as well as the movement of an intruder.

The electric protection system of the invention accomplishes the aforesaid objectives through a novel combination comprising a source of modulated light energy, a bank of energy transducers which produce an alternating signal voltage modulated by the effect of motion occurring within the protected space, means for preventing variations in the extraneous illumination level from interfering with said signal voltage, means to effectuate a desired balance between the outputs of different portions of said bank of energy transducers, electronic circuitry specifically arranged to respond to said modulated signal voltage and to produce an output voltage and alarm signaling means coupled to said electronic circuitry and arranged to produce an alarm signal indication when said output voltage departs from a predetermined level for a predetermined period.

A particularly important feature of the invention has been the utilization of ordinary means of room illumination as the energy source whereby the complexities and costs of high frequency energy generation apparatus are eliminated.

Another object of the persent invention has been the provision of a method of operation whereby the system is made unresponsive to variations in the ambient daylight or to random, external moving lights which may penetrate the protected zone.

Still another object of the present invention has been the provision of a motion detection system which is not subject to the evolution of false alarm indications upon the occasion of brief reductions in the voltage of the power supply.

Another feature of the invention has been the provision of means whereby the apparatus is rendered particularly sensitive to motion within the protected space including attempts to disable the apparatus.

Still another feature of the invention has been the provision of means to preclude the evolution of false alarm indications caused by short duration bursts of electrical "noise" within the electronic circuitry.

Other and further objects, features and advantages of the invention will appear more fully from the following description of the invention taken in connection with the appended drawings, in which.

Figure 5:
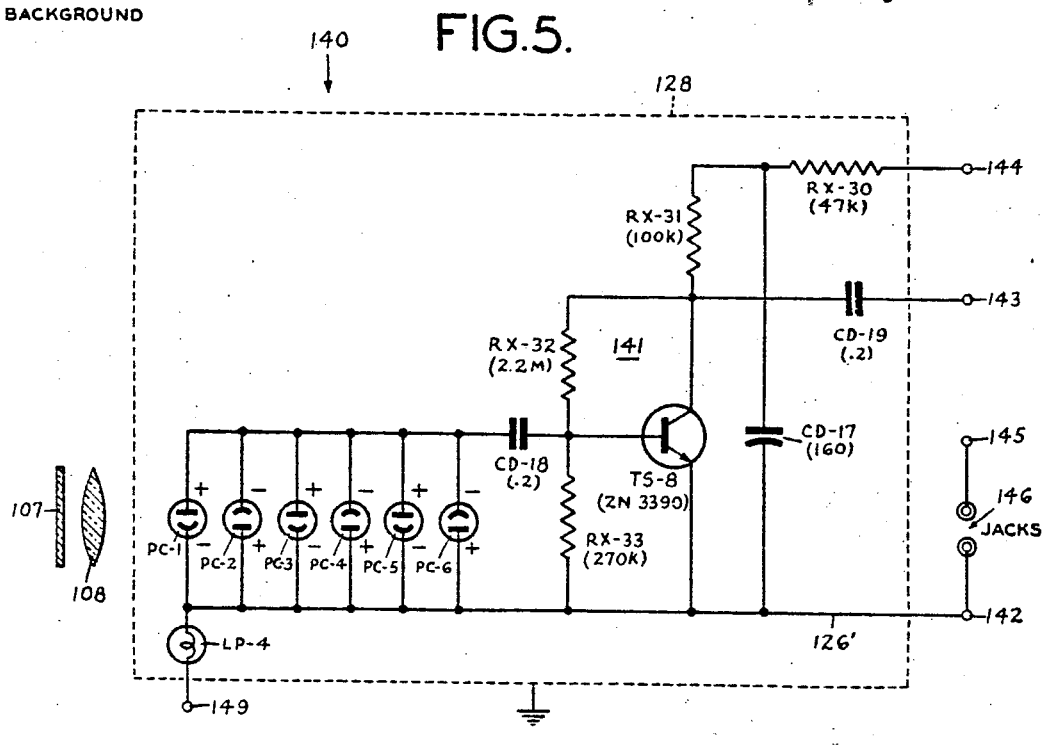
Figure 3:
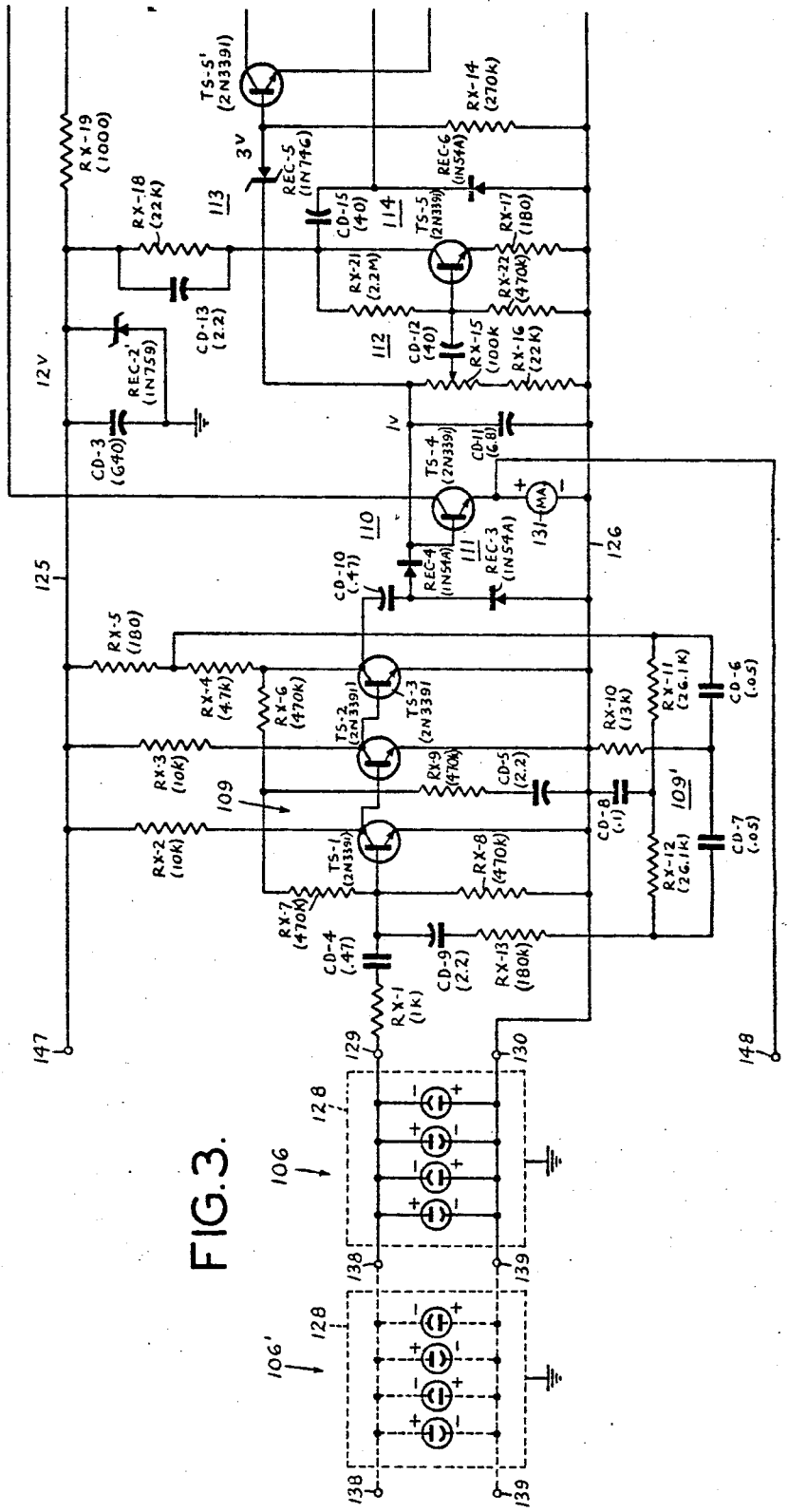

FIGS. 3 and 4, when joined together, are a schematic illustration of a circuit arrangement embodying the invention;

FIG. 5 is a schematic illustration of an alternate design for the detector unit; and FIG. 6 is a schematic illustration of an arrangement for the interconnection of remotely located detector units.

Figure 1:
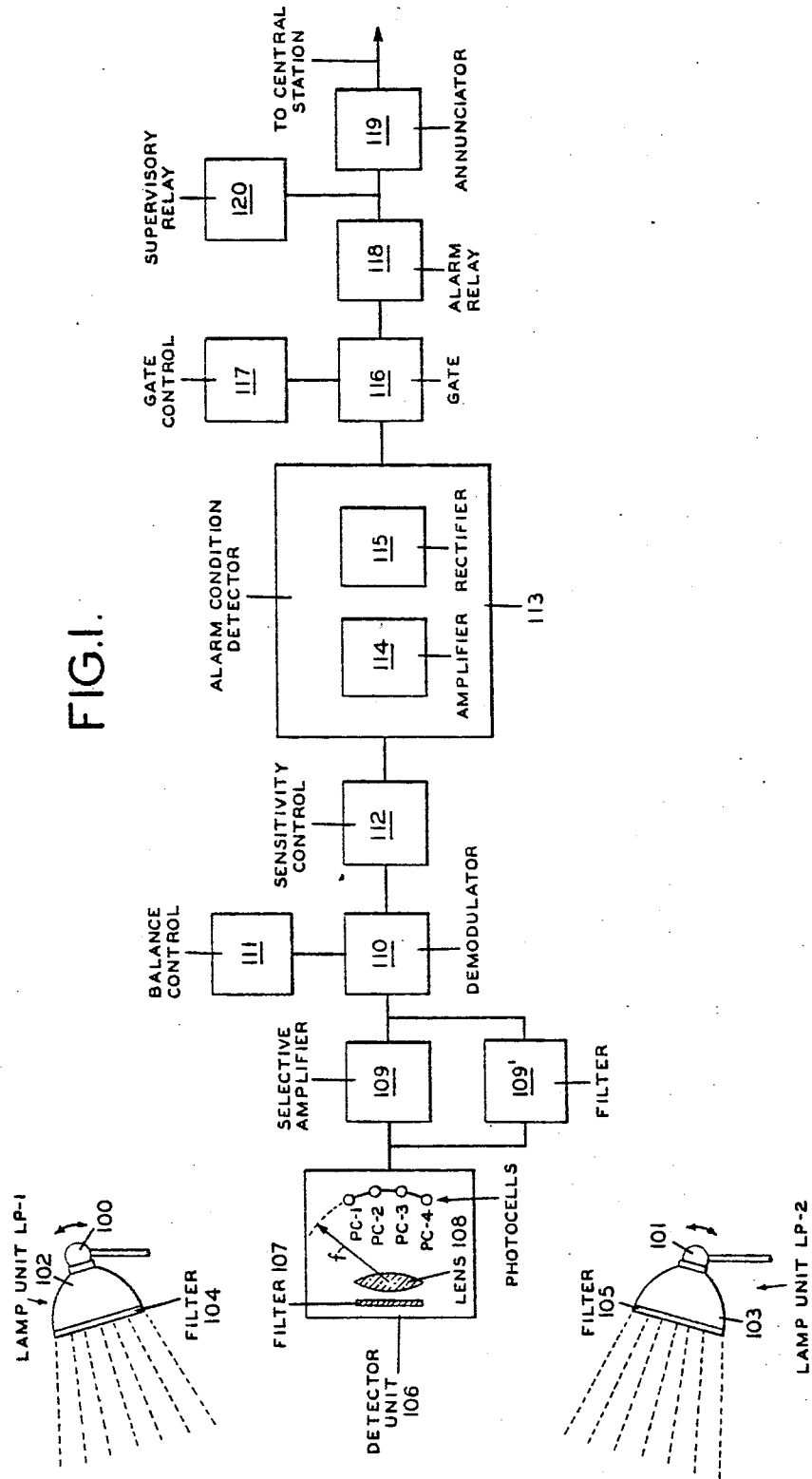
FIG. 1 is a block diagram of a system embodying the invention.

In a preferred embodiment of the invention, all of the components indicated in FIG. 1 are combined in a single housing thereby providing a compact unit which may be transported from place to place and put into service in various locations as desired with a minimum of installation effort and facilities required. The installation details will vary according to the physical dimensions of the space to be protected and the type of protection service desired. Thus, for a simple residential installation where only a local annunciation of alarm signals is required, the only external facility necessary is a source of 110 volt, 60 cycle power.

For the commercial type of premises where connection to a central station is desired so that the protection system will be under constant supervision, a telephone line or equivalent connection to the central station will be required in addition to the power source. When it is desired to protect an unusually large space or more than one room from a single control device or when the space to be protected is of unusual configuration, as, for instance, a long narrow corridor, it will be necessary to provide additional detector units, additional lighting facilities and, in some cases, special detector units as will be described in detail hereinafter.

The light energy filling the space to be protected is provided by lamp units LP-1 and LP-2 which are pivotably mounted at 100 and 101, respectively, so that they may be independently rotated in the horizontal plane. The lamps may be conveniently ordinary 7 watt, 110 volt incandescent bulbs mounted in parabolic reflectors 102 and 103, respectively, and provided with deep red filter glasses 104 and 105, respectively, so that the light emanating therefrom will be in the infrared range and consequently virtually invisible to the eye in order that the configuration of the protected space will not be readily discernible to an intruder.

The light, reflected from opposing walls and various stationary objects in the protected space is received by a detector unit 106. Another filter glass 107 excludes most of the visible component of the light received by a lens 108 which focuses the received infrared energy on a bank of photovoltaic cells PC-1, PC-2, PC-3 and PC-4. The photocells are equally spaced along an arc whose radius is the focal length $f$ of the lens 108 so that each cell will be located in the image plane. The cells are electrically interconnected in parallel and in alternate polarity configuration. It has been found convenient to employ a bank of four cells and a lens having a 70-degree angle of vision, an arrangement which provides satisfactory detection of motion at ranges up to 30 feet from the detector unit. Those skilled in the art will realize from the following explanations that a different number of cells may be employed with lenses of different characteristics to provide a protection system to match the requirements of unusual installations.

The bank of photocells produces an output in the form of an alternating voltage signal having a frequency of 120 cycles per second—the natural modulation of the lamp units LP-1 and LP-2 operating on 60 cycle house current.

The cells also produce an output in response to the infrared component of the normal ambient illumination in the protected space passing the filter 107 which excludes only visible light. This component is derived from the daylight present plus the unmodulated portion of the infrared energy resulting from the thermal lag of the incandescent lamps and the light retentive properties of fluorescent lights which may also be present. This component will be large in relation to the amplitude of the alternating signal produced by the energy sources and, furthermore, will vary widely as the level of the ambient illumination changes from day to night. Such changes are prevented from interfering with the alternating signal (and possibly causing false alarms) by providing a low impedance load for the cells by means which will be more fully described hereinafter.

An object entering the field of view of the detector unit can either reflect additional light from its surfaces to the lens or block some of the light being reflected from the background to the lens. Just what will occur in any given instance depends on the size, shape, velocity and light reflecting characteristics of the object as well as the strength and location of the 60 cycle light sources. In a typical situation, however, at a given instant some photocells are probably receiving more light than they did before the object appeared while others are receiving less. As the object moves, the light pattern will vary accordingly.

The variations in the light received by the photocells produces an amplitude modulation of the alternating signal which serves as a carrier. The photocell output is applied to a selective amplifier 109 and a filter 109' where the direct current component corresponding to the ambient daylight is discarded; frequencies other than 120 cycles (and the associated side bands bearing the desired intelligence are sharply attenuated and the signal amplified.

The signal is then transferred to a demodulator 110 where the 120 cycle carrier is suppressed, leaving essentially the envelope of the amplitude modulations which comprises the intelligence portion of the original alternating signal. The intelligence is in the form of an alternating voltage in a selected frequency range. The range of from one to ten cycles per second has been found to be characteristic of the normal motions of a human intruder.

Associated with demodulator 110 is a balance control 111 which permits monitoring of the signal appearing at the output of the selective amplifier.

Balance control 111 may include a meter which reads the strength of the signal at the demodulator 110 and is employed when the detection device is being installed or adjusted.

Figure 2:
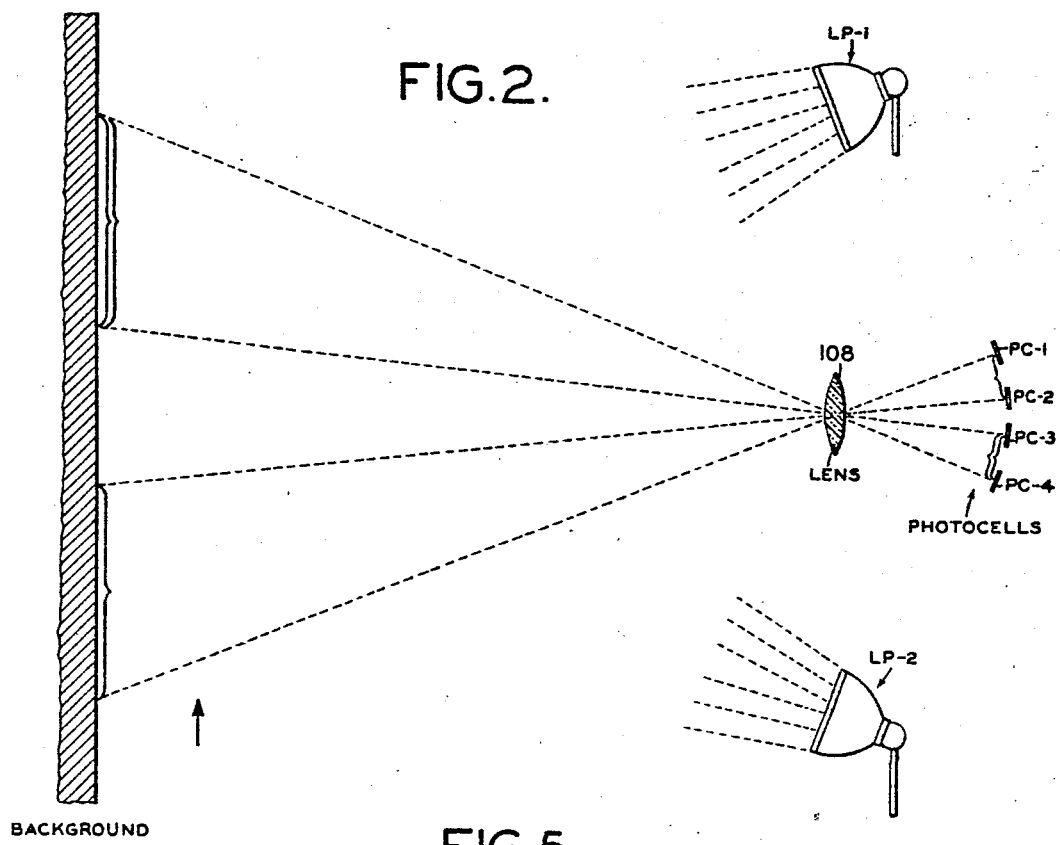
FIG. 2 is an optical diagram for use in explaining certain principles of the invention.

FIG. 2 illustrates the reflection pattern of a typical installation wherein light from the sources LP-1 and LP-2 is reflected from the background and is focused by the lens on the cells PC-1, PC-2, PC-3 and PC-4. The lens inverts the image so that light from the portion of the wall indicated by the single bracket falls on cells PC-1 and PC-2 while light from the double bracket portion falls on cells PC-3 and PC-4. Since the cells are interconnected with alternating polarity, the combined output of the positively connected cells PC-1 and PC-3 opposes the combined output of the negatively connected cells PC-2 and PC-4. If the wall 112 were absolutely uniform in light reflecting properties, the cells would cancel each other exactly and there would be no output from the entire bank.

As a practical matter, the ideal situation seldom if ever, occurs due to differences in the color and texture of the wall surface as well as the presence of doors, mirrors, pictures, drapes, etc. As a consequence, the cell pair PC-1, PC-2 viewing the single bracketed portion of the wall will have an output and that output will differ from the output derived from cell pair PC-3, PC-4 which views the double bracketed wall portion. The voltage resulting from the combination of these two outputs appears as a signal in the demodulator 110 with the amplitude thereof indicated by the meter. The lamp units LP-1 and LP-2 are then manually rotated about their respective pivots 100 and 101 in such manner that the amount of illumination falling upon different portions of the background is increased or diminished. By this means the outputs of the cells are so balanced (as indicated by a small positive reading on the meter) that the carrier signal is of small magnitude. Since the apparatus will produce an alarm warning when the carrier signal exceeds a predetermined level, it is desirable to establish an initially low level to provide a degree of tolerance for changes in the light pattern. Such a condition might arise if the furnishings in the protected space were rearranged without rebalancing of the system. A low original level however will permit a degree of change in the light pattern without rendering the system excessively close to the predetermined alarm level. It is obvious that the same effect could be achieved by shifting individual photocells, by partially shielding certain cells or through the provision of variable impedance devices in the cell output circuits. Rotation of the lamp units, however, is the simplest and most practical means for achieving the desired result.

An intruder entering the scene in the direction of the arrow (FIG. 2) will be "seen" first by the cell PC-1 whose output may be either increased by reason of an increased amount of light energy being reflected from this person (as by a white shirt) or decreased by reason of his body blocking off some of the light normally reflected from the background to that cell. In either case, the output from the balanced cell pair PC-1, PC-2 is increased, positively or negatively, because the output of cell PC-2 has not yet been changed. As the intruder proceeds, his image passes from cell PC-1 to cell PC-2 where the phenomenon is repeated and the effect thereof is heightened by the transition from one cell to the second by the push-pull action arising from the alternate polarity interconnection of the cells. The repetition of the effect as the intruder traverses the space produces the amplitude modulation of the 120 cycle per second carrier signal.

If smoke appears in the protected space, light will be reflected from the smoke particles to the photocells by the well known Tyndall Effect and the motion of the particles in response to convection currents and random air movements produces a similar effect on the output of the photocell bank. If the smoke is dense enough, some of the light reflected from the background will be blocked with corresponding effect upon the cells or there will be sufficient light reflected from the particles to initiate the alarm even without movement of the particles. The sensitivity of response to the presence of smoke by the Tyndall Effect is the greatest where the light concentration is highest. Consequently, if it is desired to employ the system as a smoke detector, the level of the illumination should be raised as far as is reasonably practical through the provision of higher wattage bulbs in the lamp units and/or by the provision of additional lamp units. If possible, it is also desirable to arrange the beams from lamp units LP-1, LP-2 to cross in front of the detector so that their cumulative effect will produce a zone of high light concentration in direct view of the lens.

The present invention possesses distinct advantages as a smoke detector over the projected beam and spot type devices of the prior art. The projected beam type of smoke detector comprises a beam of light directed upon a photocell device from a considerable distance—as from the opposite side of the room. Alarms are generated when the presence of smoke diminishes the amount of light reaching the photocell to a predetermined level. Such devices "integrate" the effect of smoke over a long distance and will thus produce the desired alarm when the smoke density per linear foot is very low. However, the cost and complexity of the installation of two units of apparatus are involved as well as the possibility of false alarms caused by accidental interruptions of the light beam. The spot type detector consisting of a single small chamber which contains both light source and photocells overcomes the aforementioned difficulties but is less sensitive as the alarm will not be generated until smoke of substantial density penetrates the chamber.

The present system preserves the cost and installation advantages of the spot type detector while also presenting the benefits of the "integration" effect of the projected beam type due to the depth of the field of vision. Furthermore, the three modes of smoke detection, i.e., by obscuration of the light normally reflected from background surfaces, by increase in light due to reflections from smoke particles and by motion of light reflected from moving particles provide a high degree of assurance that varying types of smoke conditions will be detected.

The presence of an open flame in the protected space will also cause the system to respond by the production of an alarm indication. It is known that flames possess an inherent flicker frequency in the range of about 5 to 25 cycles per second and a higher harmonic of the frequencies present in the flame adds directly to the 120 cycle carrier to produce the alarm signal indication.

The output of the demodulator, which consists of the modulations which have been imposed on the carrier, is then passed to the sensitivity control 112 (FIG. 1) by which means the detection system may be set to respond to a desired amount of motion within the protected space. The sensitivity control output is applied to the alarm condition detector 113 in the form of a small positive voltage. The alarm condition detector, including an amplifier 114 and a rectifier 115, detects variations in the sensitivity control output voltage and produces an alarm signal that is fed to a gate 116 which is monitored by a gate control 117.

The gate control 117 is responsive to decreases in the power supply voltage and, upon such an occurrence, closes the gate 116 thereby preventing a subsequent restoration of power from causing a false alarm indication.

Genuine alarm signals pass through gate 116 to an alarm relay 118 which operates an annunciator 119 to provide a local audible alarm signal and to transfer alarm signals to a remote central station, if such a connection has been provided.

A supervisory relay 120 shown between alarm relay 118 and annunciator 119, also controls the annunciator in such manner as to provide distinctive annunciation of extended power failures both locally and at the central station.

The detailed operation of a circuit embodying the principles of the present invention will now be described in conjunction with FIGS. 3 and 4 wherein typical values of the resistors and capacitors are shown in ohms and microfarads respectively, within brackets adjacent to the pictorial representation of the circuit component. Standard type designations of the diodes and transistors are indicated in like manner. While specific values of the various components as well as operating voltages are referred to herein, they are intended for illustrative purposes only and not as limitations of the invention.

A source of 110 volt, 60 cycles per second potential is applied to a primary winding 123 of a step down transformer TF from terminals 121 and 122. The lamp units LP-1, LP-2 are connected in parallel across the primary winding and a fuse FS is series connected between terminal 121 and the lamp units. A multi-contact, three position switch whose function is to place the system in the ON, OFF and TEST conditions has a contact SW-1 located between terminal 121 and the primary winding and another contact SW-2 between the primary winding and terminal 122. The switch has two other contacts (SW-3, SW-4) and each of the four contacts, while having but two positions, has a particular setting for each of the three system conditions. FIGS. 3 and 4 show the system in the ON condition and contacts SW-1, SW-2 are closed. When the system is switched to the TEST position, as will be described subsequently, contacts SW-1, SW-2 remain closed but will open when the system is shut OFF. The words ON, OFF and TEST appearing adjacent the pictorial representations of the switch contacts indicate the position of the contact in each of the three system conditions.

Secondary winding 124 of the transformer TF provides a potential of 24 volts which, after full wave rectification by diodes REC-1, REC-2 connected in series with the secondary winding, is applied to a conductor 125 to provide direct current operating potential for the electronic network. The ripple in the potential thus derived is successively smoothed by capacitors CD-1, CD-2 and CD-3 which connect conductor 125 to ground, i.e., the chassis potential. A Zener diode REC-2' connected in parallel with capacitor CD-3 between conductor 125 and chassis ground serves to stabilize the supply potential when surges are caused by the operation of the alarm relay 118.

The chassis potential is derived from conductor 126 which is center tapped into the secondary winding 124 and grounded to the chassis at 127. Conductor 126 serves as the return path for the electronic network.

The detector unit 106 (FIG. 3) is provided with a metallic shield 128 grounded to the chassis which protects the enclosed photocells from ambient light (save through the lens) and from any electrical potential that may be induced from adjacent electrical apparatus. The photocells PC-1, PC-2, PC-3 and PC-4 are connected in parallel and in alternating polarity to input terminals 129, 130 of the electronic network. Silicon solar cells have been found to be particularly well suited to the purposes of the present invention due to their ability to produce a linear increase in output current upon an increase in the illumination level and satisfactory response in the infrared energy range.

The cell output is fed to the selective amplifier 109 through a resistor RX-1 which prevents the capacitance of the interconnecting cable from setting up parasitic oscillations in the amplifier and a coupling capacitor CD-4 which blocks any direct current components in the cell output.

The selective amplifier 109 comprises three transistors TS-1, TS-2, TS-3 and two feedback circuits. The emitters of the three transistors are connected directly to ground while the collectors of transistors TS-1 and TS-2 are coupled to the D.C. voltage supply conductor 125 through load resistors RX-2 and RX-3 respectively. The collector of transistor TS-3 is coupled to conductor 125 through the series combination of resistors RX-4 and RX-5. The alternating current signal passing capacitor CD-4 is fed to the base of transistor TS-1 while the bases of transistors TS-2 and TS-3 are connected to the collectors of transistors TS-1 and TS-2 respectively.

A broad band direct current feedback circuit is established by a path from the collector of transistor TS-3 through series connected resistors RX-6 and RX-7 to the base of transistor TS-1 and thence through biasing resistor RX-8 to ground. A path connecting the junction of resistors RX-6 and RX-7 to ground contains series connected resistor RX-9, which is the primary control of the selective amplifier gain, and capacitor CD-5 which establishes the cut-off point somewhere below 120 cycles.

A second feedback path extends from the junction of resistors RX-4 (which reduces the signal below that of the first feedback path) and RX-5 through a notch filter 109' to the base of transistor TS-1. The filter, whose function is to attenuate the gain of the selective amplifier for all frequencies other than 120 cycles, comprises the parallel combination of series connected capacitors CD-6 and CD-7, whose junction is coupled to ground through the resistor RX-10, and series connected resistors RX-11 and RX-12 whose junction is coupled to ground through capacitor CD-8. The output of the parallel combination is applied to the base of transistor TS-1 through series connected buffer resistor RX-13 and coupling capacitor CD-9.

An important step of the method of the invention is providing a low impedance load for the photocells. One advantage derived therefrom is the ability to operate additional detector units from a single control unit when it is desired to extend the protection to include further spaces. Of greater importance, however, is the improved operation of the system which results therefrom. Photocells of the type suitable for use with the invention exhibit the characteristic of producing a logarithmic increase in the voltage at the output terminals as the level of the incident illumination is increased under open circuit conditions, i.e., when no electrical load has been imposed, but when the output terminals are short circuited, the current therethrough increases linearly with the illumination level.

The present invention employs two means of providing a low impedance load. Since the other cells present constitute a load for each individual cell, the cells are interconnected in parallel as so doing results in the least impedance load for any particular cell. The other means is the arrangement of the selective amplifier to have a low input impedance which is of further benefit in providing efficient coupling to the photocells.

In any typical installation, the detector unit will be subject to unmodulated infrared energy as well as the 120 cycle signal generated by the lamp units. Furthermore, the unmodulated energy level will vary over a wide range as the sun progresses or is obscured by a passing cloud and as the headlights of passing vehicles are reflected into the protected space. In response, the photocells produce a direct output signal of varying intensity in addition to the alternating signal resulting from the modulated energy sources. If the load impedance were high, its effect on the photocells would approach that of the open circuit condition and the photocell voltages (following a logarithmic function as the ambient illumination level varied) would produce unwanted changes in the alternating carrier signal. Consequently, by arranging the load impedance to act more nearly as a short circuit for the photocells, the output signal remains essentially constant and interference from variations in the ambient light is avoided.

The output of selective amplifier 109 and filter 109' is applied from the collector of transistor TS-3 to the demodulator 110 through coupling capacitor CD-10. The demodulator, whose function is to separate the 120 cycle carrier from the intelligence frequency of 1 to 10 cycles which will generate the alarm signal, includes diodes REC-3 and REC-4, capacitor CD-11 and the bleeder path RX-15, RX-16. Diode REC-3 is connected between capacitor CD-10 and ground and the anode of diode REC-4 is connected to the junction of capacitor CD-10 and diode REC-3. The cathode of diode REC-4 is coupled to ground through the capacitor CD-11 and through the series combination of a variable resistor RX-15 and a fixed resistor RX-16 connected across the capacitor CD-11. Diodes REC-3 and REC-4 are connected so as to establish a positive potential at the junction of capacitor CD-11 and resistor RX-15.

Balance control 111 comprises a microammeter 131 connected between the emitter of transistor TS-4 and ground. The base of transistor TS-4 is connected to the cathode of diode REC-4 and the collector is coupled to the DC supply conductor 125 on the high side of a voltage dropping resistor RX-19. The transistor TS-4, is connected as an emitter follower to allow the use of an inexpensive, low impedance meter. Transistor TS-4 passes a portion of the output signal from the demodulator to the meter for the purpose of permitting the physical adjustments to the lamp units as hereinbefore described.

The bleeder resistors RX–15 and RX–16 connected across the capacitor CD–11 comprise the sensitivity control 112. Resistor RX–15 is variable and is employed in the usual manner to adjust the sensitivity of the response of the system to a desired level. The resistor RX–16 is provided so that the system will always have a degree of sensitivity even though the variable resistor RX–15 be left inadvertently on the minimum setting.

Since a perfect balance of the photocell output signals is rarely attainable (or even desired) a small positive voltage, known as the demodulator voltage, appears at the junction of capacitor CD–11 and resistor RX–15. Ordinarily this potential, which might be plus one volt, will become more positive when motion occurs and this change will be detected by the alarm condition detector 113 and utilized to produce the ultimate alarm warning. Under some circumstances, the voltage may become less positive but the alarm condition detector 113 will still function, albeit in a slightly different manner, to produce the desired alarm warning.

An initially positive demodulator voltage overcomes the forward bias of the diodes REC–3 and REC–4 thereby providing a more uniform sensitivity of system response even though the light pattern in the protected area may vary over a protracted period.

Both modes of operation depend upon a change occurring in the demodulator voltage. However, all protection systems are liable to attempts to disable the apparatus by various means. While the systems are essentially self-protective when in the operative condition, there is a danger of sabotage committed during the inoperative periods in preparation for a subsequent raid on the protected area. The present invention has therefore been provided with a third mode of operation as protection against such a contingency.

The demodulator voltage, or such portion thereof as may be selected by the setting of sensitivity control 112 at a particular installation is supplied from the slider of the variable resistor RX–15 to the base of a transistor TS–5 through a capacitor CD–12. Transistor TS–5, which also serves as the low frequency amplifier 114, has its emitter coupled to ground through resistor RX–17 and its collector coupled to the conductor 125 through a load resistor RX–18. A capacitor CD–13 connected in parallel with resistor RX–18 serves to complete the filtering of the 120 cycle carrier. The potential on conductor 125 at the point of junction with resistor RX–18 is 12 volts by reason of the resistors RX–19 and RX–20 series connected in conductor 125 between this point and the high side of secondary winding 124 for the purpose of providing operating potentials as desired for various sections of the electronic network. A forward bias is applied to the base of transistor TS–5 from the junction of the series connected resistors RX–21 and RX–22 which are in turn connected between the junction of resistor RX–18 and the collector of transistor TS–5 and ground. The collector of transistor TS–5 is also coupled to the base of a transistor TS–6 through a capacitor CD–15 whose negative side is connected to ground through diode REC–6.

Should the signal at the slider of variable resistor RX–15 become less positive, the corresponding change in the potential on capacitor CD–12 biases the emitter-collector circuit of transistor TS–5 to a less conductive state. Current now flows from conductor 125 through the path containing resistor RX–18 and capacitor CD–15 to the base of transistor TS–6 resulting in the instantaneous production of an alarm warning.

In the event that the demodulator voltage becomes more positive as will usually occur when motion is detected, the capacitor CD–12 discharges mainly through the path containing the resistors RX–15, RX–16 and RX–22. The discharge period may last up to several seconds depending upon the amount of change that occurred in the demodulator voltage. During this period transistor TS–5 will be forward biased allowing capacitor CD–15 to discharge rapidly via the diode REC–6, transistor TS–5 and resistor RX–17. The diode REC–6 thus serves to provide a low resistance discharge path for capacitor CD–15 so that the system can go into alarm when capacitor CD–12 stops discharging. At this time, transistor TS–5 returns to the less conductive state thereby causing charging current to flow via resistor RX–18 to capacitor CD–15 and thus injecting base current into transistor TS–6 which results in the desired alarm warning. The resistor RX–17 prevents instantaneous discharge of capacitor CD–15 thereby limiting the current flow through transistor TS–5 to avoid damage to the latter.

In the preferred embodiment of the invention, it has been found convenient to employ a common filter glass for the lens 108 and the lamp units LP–1, LP–2. It is therefore theoretically possible that an intruder might, when the system was shut off, cover the unit with a piece of cloth so that the lens would be shielded from the protected space when the protection subsequently was turned on. At this time, a strong carrier signal would be reflected from the cloth directly into the lens but no modulations could be received from the protected space. Furthermore, due to the functioning of the gate control 117, the carrier would have reached a steady state condition before the system was ready to respond.

Consequently, a third mode of operation has been provided which produces an alarm warning upon the presence of a high, constant demodulator voltage. Another signal path is established by a transistor TS–5' whose base is connected through a Zener diode REC–5 to the junction of capacitor CD–11 and resistor RX–15 and whose emitter-collector circuit forms a shunt around the transistor TS–6. A resistor RX–14 connected between ground and the junction of diode REC–5 and the base of transistor TS–6 provides a drainage path. A high, steady state demodulator voltage, say 3 volts, will cause the Zener diode REC–5 to break down and pass current to the base of transistor TS–5' which is thereby rendered conductive to establish a shunt path around transistor TS–6. Thus, when the gate 117 opens, an alarm warning will be produced.

The three modes of operation of the alarm condition detector provide alarm warnings upon a change of the demodulator voltage in either direction and also upon the occurrence of high steady state demodulator voltage. The present invention is therefore rendered highly sensitive to motion within the protected space as well as being self-protective against attempts to disable the apparatus.

The alarm signal applied to the base of transistor TS–6 (which forms a portion of the circuit to the gate 116) is rectified by the joint action of the diode REC–6 and the self-rectification properties of transistor TS–6. These components are designated as the rectifier 115. The emitter of transistor TS–6 is connected to ground through emitter resistor RX–23 and the collector is coupled to the conductor 125 through the series combination of the emitter-collector circuit of a transistor TS–7 (which is the gate 116) and the winding AL of the alarm relay 118.

The gate control circuit 117 includes a pair of series connected voltage divider resistors RX–24 and RX–25, connected between the conductors 125 and 126. The base of transistor TS–7 is connected through a current limiting resistor RX–26 to the junction of resistors RX–24 and RX–25. A second pair of series connected voltage divider resistors RX–27, RX–28 is provided between conductor 125 and ground. The junction of resistors RX–27 and RX–28 is joined to the junction of resistors RX–24 and RX–25 through a diode REC–7. A capacitor CD–14 is connected across resistor RX–25.

When motion within the protected space causes the application of an alarm signal to the base of transistor TS–6, that transistor becomes conductive provided that the signal is of sufficient strength and duration. The gate 116 is normally open (conducting) thereby establishing an energizing path for winding AL of normally deenergized alarm relay 118 between conductor 125 and ground via the collector-emitter circuits of transistors TS–7 and TS–6 and resistor RX–23. Capacitor CD–15', connected across winding AL, is normally not charged and thus will absorb any brief current pulses arising from momentary periods of conductivity of the transistor TS–6. The alarm relay is therefore protected from both low level signals and higher level signals of brief duration which are characteristic of random electrical disturbances and stray light reflections rather than true alarm conditions.

The gate control 117 performs the first of two functions when the system is switched from the OFF to the ON position. The gate 116 is open only when the base of transistor TS–7 is biased by a voltage derived from the charge on capacitor CD–14 and the capacitor CD–14 is discharged when the system is OFF. When the system is switched ON, capacitor CD–14 must charge before the gate 116 is opened, however the charging time constant is dependent upon resistors RX–24 and RX–25 and therefore several seconds must elapse before the gate is open. The delay so provided prevents false actuation of the alarm relay which might otherwise occur as a result of inrush currents before the electronic network has had time to stabilize.

The second function of the gate control 117 is to prevent false alarm indications occurring in similar manner when the power supply potential is restored after a brief interruption or fluctuation. Since it is never known how soon the normal voltage supply may be restored after an interruption, it is essential that the gate be closed rapidly when the supply potential fails. Accordingly a discharge path having a low time constant is provided for capacitor CD–14 through the diode REC–7 and resistor RX–28 to ground. The diode REC–7 is normally held non-conductive by the potential existing at the junction of resistors RX–27 and RX–28, but when the supply potential is lost, the potential at the resistor junction is likewise lost. Therefore diode REC–7 becomes conductive and capacitor CD–14 discharges rapidly to ground, closing the gate 117. Another diode REC–8 in conductor 125 is poled to prevent the charge on the large capacitor CD–2 from discharging back through resistors RX–27 and RX–28 thereby delaying the opening of the discharge path for capacitor CD–14.

Should a power outage of prolonged duration occur, it will be detected by the supervisory relay 120 whose winding S is coupled on one side to the power conductor 125 through a diode REC–9 and to ground on the other side through the normally closed back contact AL–1. The winding S is shunted through a diode REC–10 and a capacitor CD–16 is connected between the conductor 126 and the high side of winding S via a junction with the cathode of diode REC–10 in the shunt path. The supervisory relay 120 is normally energized and, upon the occasion of a power failure, deenergization is retarded for about six seconds by the discharge of capacitor CD–16 to prevent unnecessary annunciation of signals in the event the power outage is of brief duration. The diode REC–9 prevents capacitor CD–16 from interfering with the concurrent rapid closing of the gate 116 by isolating the potential thereof from the junction of resistors RX–27 and RX–28.

The annunciator 119 is arranged to provide distinctive alarm and trouble indications at either the protected premises or at a remote central station.

The annunciator circuitry includes a network having a path extending from ground through the normally open side of contact AL–1 and the normally closed ON side of the control switch contact SW–4 to a terminal B. To the left of terminal B, a removable connection or strap 132 extends the path through terminal A and a diode REC–11 to the junction of the collector of transistor TS–7 and the winding AL of alarm relay 118. On the right, another removable strap 133 joins terminal B to terminal C from whence the path extends through a horn H–1 to the junction of diode REC–9 and the winding S of supervisory relay 120.

A separate circuit is also provided which includes a nickel-cadmium battery 134 whose positive side is connected to the power conductor 125 through the series combination of a diode REC–12 and a resistor RX–29. The resistor RX–29 provides a suitable charging current for the battery 134 and the diode REC–12 prevents the battery from being drained through conductor 125 and various paths to the chassis ground when the system is turned OFF. The negative side of battery 134 is connected to chassis ground and is coupled to the positive side through the series loop connection of a horn H–2, the normally closed control switch contact SW–3, a removable strap 135 which bridges the terminals D–E and the normally open back contact S–1 of the supervisory relay 120.

When it is desired to operate the system on a purely local basis, i.e., without connection to a central station, the apparatus will produce audible warning signals to indicate both power failures and alarm conditions. Alarm signals are annunciated by the sounding of horns H–1 and H–2 simultaneously while power failures are annunciated by the sounding of horn H–2 alone. As a further means of distinguishing between the signals, the horn H–2 may be of a different pitch and less volume than horn H–1.

With straps 132, 133 and 135 in place, an alarm signal is produced when energization of the alarm relay 118 causes contact AL–1 to transfer and complete a circuit path from the power conductor 125 through diode REC–9, horn H–1, strap 133, switch contact SW–4 and alarm relay contact AL–1 to the chassis ground conductor 126. The horn H–1 is thus caused to sound. At the same time, a holding circuit is established from the winding AL to the ground conductor 126 via the diode REC–11 (which prevents any current feedback that might damage transistors TS–6 and TS–7), terminals A–B, control switch SW–4 and contact AL–1 to lock the alarm relay in the energized position.

The transfer of contact AL–1 also opens the energizing circuit to the supervisory relay 120 which, after a delay of about 50 milliseconds whose purpose will be explained hereinafter, deenergizes to close contact S–1. The closure of contact S–1 completes the circuit from battery 134 to horn H–2 via the path from the positive side of the battery through contact S–1, strap 135, control switch contact SW–3 and horn H–2 to the negative side of the battery. Both horns will now sound until the system is manually reset by momentary operation of the control switch to the OFF position.

In the event of a power failure, the normally energized supervisory relay 120 will be held energized for about six seconds by the capacitor CD–16. If the outage continues beyond this interval, the winding S will become deenergized and the consequent closure of contact S–1 applies the potential of battery 134 to the horn H–2. A trouble condition is thus annunciated by the sounding of one horn in distinction to the alarm signals which are annunciated by the sounding of both horns. The trouble signal may be silenced either automatically as the restoration of power causes the supervisory relay to reenergize and open contact S–1 or manually by means of the control switch.

Silencing of the horns in either the trouble or the alarm condition is accomplished by turning the control switch to the OFF position thus opening the contact SW–3 and transferring contact SW–4. The opening of contact SW–3 disconnects horn H–2 from the battery 134 (the trouble indication) while the transfer of contact SW–4 opens the energizing path for horn H–1.

If connection to a central station 137 is desired, a telephone line connection 136 is provided from that point to a pair of terminals designated F and G. An additional, normally closed contact AL–2 of the alarm relay 118 is connected in a loop between terminals F and G. The loop is connected to an earth ground at a terminal H through an additional, normally open contact S–2 of the supervisory relay 120. A supervisory current provided by a source at the central station flows through the telephone line loop continuously.

Ordinarily, it is not desired to have local annunciation when a central station connection is employed. Consequently, strap 133 would be removed to disconnect horn H–1 from the power supply and strap 135 would be removed to disconnect horn H–2 from the battery 134. Likewise, the strap 132 ordinarily would be removed.

Upon the occurrence of an alarm condition, the alarm relay 118 becomes energized causing contact AL–1 to transfer. Contact AL–2 is concurrently opened thereby interrupting the supervisory current flowing through the telephone line loop and produces the customary "break" signal indication at the central station. The transfer of contact AL–1 opens the path to ground for the winding S of the supervisory relay 120, however the diode REC–10 retards the deenergization thereof for about 50 milliseconds to allow time for the "break" signal to be registered at the central station. When the supervisory relay deenergizes, contact S–2 closes to ground the telephone line loop at terminal H and produce a "ground" signal at the central station. The receipt of a "double drop" signal consisting of a "break" signal followed by a "ground" signal is the standard central station indication of an alarm signal as is well known in the art.

In the event of a power failure persisting beyond the retard period provided by the capacitor CD–16, the deenergization of the supervisory relay 120 and consequent closure of contact S–2 will ground the telephone line loop to produce a "ground" signal at the central station as an indication of the trouble.

When the holding circuit for the alarm relay 118 is not employed (strap 132 removed) and an alarm signal of sufficient strength and duration to energize the alarm relay occurs, the relay will remain energized for at least one second by reason of the discharge of capacitor CD–15′ through the winding AL and the effect of the long time constants provided by capacitors CD–11, CD–12 and CD–13 and their associated circuitry. Thus, if the detected motion were to cease or even if the power were to fail at this critical moment, it is assured that the alarm relay will remain energized long enough for the warning signal to be registered at the central station.

If a "locked-in" ground signal is desired as an alarm indication at the central station, it is only necessary to install the strap 132 which establishes the holding circuit for the alarm relay. Thereafter, once contact S–2 closes, it cannot re-open because the contact AL–1 is being held in a position to prevent the re-energization of the supervisory relay.

While several modes of operation of the system have been described, those skilled in the art will recognize that various other combinations of local annunciation and central station annunciation can readily be formed.

It is, of course, desirable that tests be made both at the time of installation and at intervals thereafter to assure that adequate coverage of the space to be protected exists. Such testing is best accomplished by a person walking about in the protected zone and observing the system limits by the production of alarm signals. However, the locking-in feature of the alarm signal would make the process difficult because the unit would have to be manually reset after each signal.

Therefore, a pilot lamp LP–3 has been provided to substitute for the horns during the testing procedure. The person making the test has therefore but to remain motionless for a few seconds after causing an alarm and the system will automatically restore to the normal condition.

Setting the control switch to the TEST Position opens the contact SW–3 to disconnect horn H–2 from the battery 134. Contact SW–4 is similarly transferred to open the circuit to horn H–1 and to close a circuit from the chassis ground conductor 126 through the alarm relay contact AL–1, switch contact SW–4, lamp LP–3 and the diode REC–9 to the power conductor 125. Subsequent operation of alarm relay 118 will transfer the contact AL–1 and illuminate lamp LP–3 through the circuit path just described instead of sounding the horns.

The operation of the system when in the ON condition may be tested from a remote place, such as the central station 137, through the provision of relay means arranged to turn off one or more of the lamp units regularly employed with the system. The shutting off of a portion of the light normally being received by the detector unit 106 will be detected and an alarm signal produced to indicate that the system is in proper operating condition.

While the detector unit has been designed to provide optimum protection for rooms of normal proportions, those skilled in the art will recognize that the depth of the protected zone depends primarily on the type of lens employed and that the included angle of vision depends primarily on the total surface area of the photocells. A larger lens that can collect more light will extend the depth of the protected space whereas increasing the width of the bank of photocells will enlarge the included angle of vision. The design of the detector unit may thus be modified to meet the requirements of a long, narrow area such as a hallway.

The size and shape of the zone of protection may also be altered by the use of additional detector units 106′ which are connected to the terminals 138–139 (FIG. 3) provided for that purpose. By this means it is possible to protect more than one room from a single control unit. However, increasing the size of the space protected decreases the sensitivity of response and therefore the number of additional detector units that may be employed is limited by the degree of sensitivity required for the system.

When a number of detector units 106, 106′ are employed, the input signal to the selective amplifier will be diminished by the portion of the signal that feeds into other detector units. Or, if but one additional detector unit is employed with a cable length greater than about 20 feet, there is a possibility that adjacent power lines will induce interference signals in the connecting cable which may produce false alarm indications. Both conditions may be obviated by the use of the alternate design for the detector unit illustrated in FIG. 5 and the junction box illustrated in FIG. 6.

These objectives are accomplished by means of a special detector unit having a high output impedance which prevents each unit from absorbing the output of other units and having a preamplifier stage to increase the level of the signal derived from the photocells before application to the long cable. The gain thus produced is attenuated before the signal enters the selective amplifier with the result that the photocell signal will be approximately at the original level but any extraneous induced signals will be reduced to a harmless level. Since each detector unit cable requires attenuating resistance, it has been found convenient to provide a junction box at which all cables converge and which is connected to the selective amplifier by a short length of shielded cable.

The special detector unit is designated generally at 140 and a grounded metallic shield 128 is provided as well as an optical filter glass 107 and lens 108 as was the case with detector unit 106. Six photocells, PC–1 through PC–6, however have been employed in conjunction with a larger lens to increase the size of the protected zone. The cells, arranged in alternating polarity, are again connected in parallel so that five cells always act as a D.C. load for the remaining cell; the arrangement which aids in maintaining a constant rate of increase in current output when the illumination level rises. Interposed between the cells and the output terminals is a transistor preamplifier stage 141 which provides the desired input impedance and signal amplification.

The unit 140 is provided with exterior terminals 142, 143, 144, 145 and a pair of jacks 146. These terminals are connected to the input of the selective amplifier via the junction box as shown by FIG. 6, the specific connections being made as follows. Terminal 142 is connected to terminal 130 at the amplifier input and serves to extend the ground conductor 126. Terminal 143 is connected to terminal 129 by means of a shielded lead which constitutes the signal path to the amplifier. Terminal 144 is connected to terminal 147 and thus serves to supply power from the conductor 125. Terminal 145 is connected to terminal 148 thereby enabling the signal at balance control 111 to be read by means of a portable meter connected to the jacks 146 which bridge the terminals 142 and 145.

The collector of transistor TS–8 is connected to terminal 144 through the series combination of load resistor RX–31 and a resistor RX–30. A capacitor CD–17 is connected between the junction of resistors RX–30 and RX–31 and the portion 126' of the ground conductor extending from terminal 142. Power for the preamplifier stage 141 is derived from terminal 144 through resistor RX–30 which serves with capacitor CD–17 as a filter and decoupling component for the stage. The emitter of transistor TS–8 is connected directly to the ground conductor 126'. Bias voltage is applied to the base of transistor TS–8 from the junction of series resistors RX–32 and RX–33 which are connected between the junction of resistor RX–31 and the collector of transistor TS–8 and the ground conductor 126'. The output of the photocells is applied to the base of transistor TS–8 through a coupling capacitor CD–18 which blocks the D.C. component of the cell output. The output of the preamplifier stage is fed from the collector of transistor TS–8 through a capacitor CD–19 to terminal 143 and thence to the input terminal 129 of the selective amplifier 109. Capacitor CD–19 protects the D.C. operating point of the first stage (transistor TS–1) of the amplifier.

The operation of the special detector unit 140 is equivalent to that of the standard unit 106 save for the presence of the preamplifier stage 141. As a convenience during installation, the jack 146 has been provided so that the signal at the balance control 111 (which may be in another room) may be read by means of a portable meter.

Remote detector units may be protected against being covered by a cloth during the period the system is shut off by providing each such unit with a 5-volt subminiature low power filament incandescent lamp LP–4 which is connected between the ground conductor extension 126' and a terminal 149. Power for lamp LP–4 is derived from a filament transformer TF–1 whose primary winding is connected across the primary winding 123 of transformer TF and whose secondary is connected to the ground conductor 126 on one side and a terminal 150 on the otherside. Terminals 149–150 are connected by an external conductor via the junction box.

The presence of the lamp LP–4 in the event of a cloth draped over the detector unit will reflect a strong carrier signal into the lens and produce the desired warning signal by means of the third mode of operation of the alarm condition detector 113 as hereinfore described.

The junction box 151 (FIG. 6) is protected by a grounded metallic shield 128 and contains a number of rows of terminals and the attenuating resistors. Facilities for two detector units are illustrated in FIG. 6, however it will be understood that additional facilities could be provided in similar manner to accommodate further detector units.

A single detector unit 140 is coupled to the control unit via the following connections. Power for the small lamp LP–4 is drawn from terminal 150 via conductors which interconnect terminals G–2, G–1 and 149. The chassis ground is similarly extended via terminals 130, F–2, F–1 and 142. The jacks 146 are connected via terminals 145, E–1, E–2, and 148 and operating potential is derived from terminal 147 via terminals D–2, D–1 and 144. The signal path extends from terminal 143 on the detector unit to terminal 129 of the selective amplifier input by a path which may selectively include terminals A–1, B–1, C–1, strap 152, resistors RX–34, RX–35 and terminal A–2.

The multiple connections thus provided for the signal path permit three sensitivity settings for each detector unit which are independent of the settings of the other detector units present. The greatest sensitivity is obtained with the resistors R–34 and RX–35 connected in parallel by means of a removable strap 152 which interconnects terminals A–1 and B–1 while terminal 143 is connected to terminal C–1. The attenuated signal is fed from terminal A–1 to the input terminal 129 by means of connections to terminal A–2. Parallel connection of the attenuating resistors RX–34, RX–35 (as shown in FIG. 6) produces the least attenuation.

A medium sensitivity setting is obtained by the use of a single resistor as results from the removal of strap 152. The signal path then extends from terminal 143 via terminal C–1, resistor RX–35 and terminals A–1, A–2 to input terminal 129.

The least sensitivity and the highest attenuation of both the signal and interference noise is obtained with the resistors RX–34, RX–35 connected in series and is achieved by connecting terminal 143 to terminal B–1 in the absence of strap 152. The signal path now extends from terminal 143 through terminal B–1, resistor RX–34, terminal C–1, resistor RX–35, terminals A–1, A–2 to input terminal 129.

A second detector unit would be connected by joining the terminals 149, 142, 145, 144 to junction box terminals G–2, F–2, E–2, D–2 respectively, while the signal path is established via terminals A–2, B–2, C–2, attenuating resistors RX–36, RX–37 and strap 153 to obtain the desired sensitivity setting as hereinbefore described.

When larger spaces are protected, it may be found desirable to provide additional illumination by means of additional electric lights which, by increasing the illumination level, will improve the sensitivity of response. On the other hand, in small rooms it may be found that the system will provide satisfactory service from the standard room lighting fixtures without the use of the lamp units LP–1 and LP–2. It is always preferable to direct as much of the lighting as possible onto the background so that the presence of an intruder will cause the greatest disturbance of the light pattern. Care should be taken that none of the lights are so positioned as to shine directly on a detector unit as so doing tends to saturate the amplifier with the carier signal thereby decreasing the sensitivity of response.

While the invention has been described in connection with a specific embodiment thereof wherein the system has been arranged to operate in conjunction with the natural 120 cycle modulation of ordinary lighting devices, it will be apparent that other frequencies produced by electronic means, mechanical light chopping devices or simply from power sources operating at other frequencies could be employed with equal benefit.

What is claimed is:

1. The method of detecting motion in a protected space, comprising the steps of filling said space with illumination having at least a substantial alternating component, separately detecting at a plurality of closely spaced separate points illumination reflected from said space and light-reflective objects therein and producing a corresponding alternating voltage having a carrier frequency equal to the frequency of said alternating component, said carrier frequency alternating voltage being amplitude modulated by changes in detected reflected illumination resulting from motion of objects in said space, amplifying said alternating voltage, suppressing from said alternating voltage direct current components, then demodulating said alternating voltage to produce a signal corresponding to modulation components in said alternating voltage, detecting variations in said signal, and producing an alarm indication in response to detection of a preselected variation in said signal.

2. The method of detecting motion in a protected space, comprising the steps of filling said space with illumination having at least a substantial alternating component, separately detecting at a plurality of closely spaced separate points illumination reflected from said space and light-reflective objects therein and producing a corresponding alternating voltage having a carrier frequency equal to the frequency of said alternating component, said carrier frequency alternating voltage being amplitude modulated by changes in detected reflected illumination resulting from motion of objects in said space, amplifying said alternating voltage, suppressing from said alternating voltage direct current components and modulation components outside a selected frequency range, then demodulating said alternating voltage to produce a signal corresponding to modulation components in said selected frequency range in said alternating voltage, detecting variations in said signal, and producing an alarm indication in response to detection of a preselected variation in said signal.

3. The method of detecting motion in a protected space, comprising the steps of filling said space with illumination having at least a substantial alternating component, focusing illumination reflected from said space and light-reflective objects therein on a plurality of closely spaced, discrete points, separately detecting at said plurality of points said illumination reflected from said space and light-reflective objects therein and producing a corresponding alternating voltage having a carrier frequency equal to the frequency of said alternating component, said carrier frequency alternating voltage being amplitude modulated by changes in detected reflected illumination resulting from motion of objects in said space, amplifying said alternating voltage, suppressing from said alternating voltage direct current components and modulation components outside a selected frequency range, then demodulating said alternating voltage to produce a signal corresponding to modulation components in said selected frequency range in said alternating voltage, detecting variations in said signal, and producing an alarm indication in response to detection of a preselected variation in said signal.

4. The method set forth in claim 3 in which said alternating voltage, in the absence of motion of objects in said space, has a value other than zero whereby suppression of said illumination to prevent detecting of motion of objects in said space results in production of an alarm indication.

5. The method set forth in claim 3, comprising the additional steps of detecting a steady state value of said demodulated alternating voltage above a predetermined value, and producing an alarm indication in response to said last mentioned detection.

6. The method of detecting motion in a protected space, comprising the steps of filling said space with artificial illumination having at least a substantial alternating component of twice the commercial power frequency, separately detecting at a plurality of closely spaced separate points illumination reflected from said space and light-reflective objects therein and producing a corresponding alternating voltage having a carrier frequency equal to said power frequency, said carrier frequency alternating voltage being amplitude modulated by changes in detected reflected illumination resulting from motion of objects in said space, amplifying said alternating voltage, suppressing from said alternating voltage direct current components and modulation components outside a selected frequency range, then demodulating said alternating voltage to produce a signal corresponding to modulation components in said selected frequency range in said alternating voltage, detecting variations in said signal, producing an alarm indication in response to detection of a preselected variation in said signal, and suppressing production of an alarm indication upon return of power after momentary failure of said commercial power.

7. The method of detecting fire and smoke in a protected space, comprising the steps of filling said space with illumination having at least a substantial alternating component, separately detecting at a plurality of closely spaced separate points the combined illumination from fire in said space and illumination reflected from said space and light-reflective objects including smoke particles therein and producing a corresponding alternating voltage having a carrier frequency equal to the frequency of said alternating component, said carrier frequency alternating voltage being amplitude modulated by the flicker of fire illumination and by changes in detected reflected illumination resulting from motion of objects including smoke particles in said space, amplifying said alternating voltage, suppressing from said alternating voltage direct current components and modulation components outside a selected frequency range of about one to ten cycles per second, then demodulating said alternating voltage to produce a signal corresponding to modulation components in said selected frequency range in said alternating voltage detecting variations in said signal, and producing an alarm indication in response to detection of a preselected variation in said signal.

8. Apparatus for detecting motion in a protected space; comprising a source of illumination for said space, said illumination having a substantial alternating component; a detector comprising means to focus illumination reflected from said space and objects therein, and a plurality of closely spaced photocells disposed along an arc whereby each photocell is located in the image plane of said focusing means, said photocells being connected in parallel in alternate polarity configuration to produce an alternating voltage having a carrier frequency equal to the frequency of said alternating component, said alternating voltage being amplitude modulated by changes in illumination incident on said photocells; selective amplifying means having an input circuit coupled to said photocells; means including a negative feedback circuit intercoupling the output and input circuits of said amplifying means substantially to attenuate the gain of said amplifying means except for said carrier frequency and a selected range of modulation components about said carrier frequency; demodulator means coupled to the output of said amplifier to produce a signal proportional to modulation components in said selected frequency range in said alternating voltage; alarm signalling means; and means coupled to said demodulator and said alarm signalling means to operate the latter upon a change in said signal.

9. Apparatus for detecting motion in a protected space; comprising a source of illumination for said space, said illumination having a substantial alternating component; a detector comprising lens means to focus illumination reflected from said space and objects therein, and a plurality of closely spaced photocells disposed so that each photocell is located in the image plane of said lens means, said photocells being connected in parallel in alternate polarity configuration to produce an alternating voltage having a carrier frequency equal to the frequency of said alternating component, said alternating voltage being amplitude modulated by changes in illumination incident on said photocells; selective amplifying means having a relatively low input impedance and a multi-stage transistor amplifier having an input circuit coupled to said photocells, a broad band direct current negative feedback path intercoupling the output and input circuits of said amplifier, a second negative feedback path intercoupling the output and input circuits of said amplifier and including a filter substantially to attenuate the gain of said amplifier except for said carrier frequency and a selected range of modulation components about said carrier frequency; demodulator means coupled to the output of said amplifier to produce a signal proportional to modulation components in said selected frequency range in said alternating voltage; means to adjust the sensitivity of said apparatus by adjusting the DC signal output of said demodulator, said adjusting means being arranged to assure at least a selected minimum strength of signal output in the absence of changes in illumination impinging on said photocells; alarm signalling means comprising a current responsive alarm device; and means coupled to said alarm device and to said demodulator to operate said device upon a change in said signal.

10. Apparatus for detecting motion in a protected space; comprising a source of illumination for said space, said illumination having a substantial alternating component; a detector comprising lens means to focus illumination reflected from said space and objects therein along an arc, and a plurality of closely spaced photocells disposed along said arc whereby each photocell is located in the image plane of said lens means, said photocells being connected in parallel in alternate polarity configuration to produce an alternating voltage having a carrier frequency equal to the frequency of said alternating component, said alternating voltage being amplitude modulated by changes in illumination incident on said photocells; selective amplifying means having a relatively low input impedance and comprising a multi-stage transistor amplifier having an input circuit coupled to said photocells, a broad band direct current negative feedback path intercoupling the output and input circuits of said amplifier, a second negative feedback path intercoupling the output and input circuits of said amplifier and including a notch filter substantially to attenuate the gain of said amplifier except for said carrier frequency and a selected range of modulation components about said carrier frequency; demodulator means coupled to the output of said amplifier to produce a signal proportional to modulation components in said selected frequency range in said alternating voltage; means to adjust the sensitivity of said apparatus by adjusting the DC signal output of said demodulator, said adjusting means being arranged to assure at least a selected minimum strength of signal output in the absence of changes in illumination impinging on said photocells; second amplifying means including a low frequency transistor amplifier, and circuit means including a series connected first capacitor to supply said demodulated output signal to said low frequency transistor amplifier, and a discharge path for said first capacitor; and alarm signalling means comprising a current responsive alarm relay, a transistor element coupled to said alarm relay to operate the latter upon a change in conductive condition of said transistor element, a second capacitor intercoupling the output of said low frequency transistor amplifier and the input of said transistor element and arranged upon a minimum decrease in said demodulated output signal to cause said change in conductive condition of said transistor element to operate said alarm relay, and a discharge path for said second capacitor including said low frequency transistor amplifier and being arranged so that upon a minimum increase in said demodulated output signal said first capacitor discharges and then said second capacitor discharges to cause, after a time delay, said change in conductive condition of said transistor element and operation of said alarm relay.

11. Apparatus for detecting motion in a protected space; comprising a source of illumination for said space, said illumination having a substantial alternating component; a detector comprising lens means to focus illumination reflected from said space and objects therein along an arc, and a plurality of closely spaced photocells disposed along said arc whereby each photocell is located in the image plane of said lens means, said photocells being connected in parallel in alternate polarity configuration to produce an alternating voltage having a carrier frequency equal to the frequency of said alternating component, said alternating voltage being amplitude modulated by changes in illumination incident on said photocells; selective amplifying means having a relatively low input impedance and comprising a multi-stage transistor amplifer having an input circuit coupled to said photocells, a broad band direct current negative feedback path intercoupling the output and input circuits of said amplifier, a second negative feedback path intercoupling the output and input circuits of said amplifier and including a notch filter substantially to attenuate the gain of said amplifier except for said carrier frequency and a selected range of modulation components about said carrier frequency; demodulator means coupled to the output of said amplifier to produce a signal proportional to modulation components in said selected frequency range in said alternating voltage; means to adjust the sensitivity of said apparatus by adjusting the DC signal output of said demodulator, said adjusting means being arranged to assure at least a selected minimum strength of signal output in the absence of changes in illumination impinging on said photocells; second amplifying means including a low frequency transistor amplifier, and circuit means including a series connected first capacitor to supply said demodulated output signal to said low frequency transistor amplifier, and a discharge path for said first capacitor; alarm signalling means comprising a current responsive alarm relay, a transistor element coupled to said alarm relay to operate the latter upon a change in conductive condition of said transistor element, a second capacitor intercoupling the output of said low frequency transistor amplifier and the input of said transistor element and arranged upon a minimum decrease in said demodulated output signal to cause said change in conductive condition of said transistor element to operate said alarm relay, and a discharge path for said second capacitor including said low frequency transistor amplifier and being arranged so that upon a minimum increase in said demodulated output signal said first capacitor discharges and then said second capacitor discharges to cause, after a time delay, said change in conductive condition of said transistor element and operation of said alarm relay; and means comprising a Zener diode, means to apply said demodulated output signal to said Zener diode, and an additional transistor intercoupling said Zener diode and said transistor element, said Zener diode being arranged to break down and cause said additional transistor to produce change in said conductive condition of said transistor element and operation of said alarm relay when said demodulated output signal achieves a predetermined steady state value.

12. Apparatus as set forth in claim 11, comprising gate means coupled to said alarm relay and arranged, in a first condition of said gate means, to permit operation of said alarm relay and, in a second condition of said gate means, to prevent operation of said alarm relay, means comprising a third capacitor coupled to said gate means and arranged when charged to place said gate means in said first condition thereof and when discharged to place said gate means in said second condition thereof, means normally to maintain said third capacitor charged, said last mentioned means having a time constant of at least several seconds to prevent operation of said alarm relay when operating power is supplied to said apparatus, and a discharging circuit for said third capacitor, said discharging circuit for said third capacitor having a time constant substantially lower than the time constant of said charging means for said capacitor.

(References on following page)

References Cited

UNITED STATES PATENTS

| | | |
|---|---|---|
| 1,877,279 | 9/1932 | Dawson. |
| 2,202,060 | 5/1940 | Mitchell. |
| 2,282,198 | 5/1942 | Murcek _____ 250—209 |
| 2,412,822 | 12/1946 | Malter _____ 340—258 X |
| 2,631,273 | 3/1953 | Bagno. |
| 2,762,033 | 9/1956 | Krueger _____ 340—228.2 |
| 2,813,230 | 11/1957 | Forengel _____ 250—221 X |
| 3,156,908 | 11/1964 | Kopan et al. _____ 340—228.2 |
| 3,195,043 | 7/1965 | Burig et al. |
| 3,329,946 | 7/1967 | Robbins _____ 340—258 |
| 3,370,284 | 2/1968 | Bagno _____ 340—258 |

JOHN W. CALDWELL, *Primary Examiner.*

D. L. TRAFTON, *Assistant Examiner.*

U.S. Cl. X.R.

250—221